(12) United States Patent
Yang

(10) Patent No.: US 8,892,168 B2
(45) Date of Patent: Nov. 18, 2014

(54) MOBILE TERMINAL AND METHOD OF MANAGING DISPLAY OF AN ICON IN A MOBILE TERMINAL

(75) Inventor: Seungwan Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 13/091,055

(22) Filed: Apr. 20, 2011

(65) Prior Publication Data

US 2012/0052918 A1 Mar. 1, 2012

(30) Foreign Application Priority Data

Sep. 1, 2010 (KR) .................... 10-2010-008531 7

(51) Int. Cl.
*H04W 88/02* (2009.01)
*H04M 1/725* (2006.01)
*G06F 3/0488* (2013.01)
*G06F 3/0481* (2013.01)

(52) U.S. Cl.
CPC ......... *G06F 3/0488* (2013.01); *H04M 1/72583* (2013.01); *G06F 3/04883* (2013.01); *H04M 2250/22* (2013.01); *G06F 3/04817* (2013.01)
USPC ............................ 455/566; 340/689; 715/772

(58) Field of Classification Search
CPC .................... H04M 1/72583; H04M 1/72527; G06F 3/0481; G06F 3/0482; G08B 13/1436; H04L 45/02
USPC ........ 455/566, 556.2; 715/772, 811; 340/689; 370/254
See application file for complete search history.

(56) References Cited

U.S. PATENT DOCUMENTS

2003/0076322 A1 4/2003 Ouzts et al.
2009/0150820 A1* 6/2009 Hayman ....................... 715/772

FOREIGN PATENT DOCUMENTS

| CN | 1902575 | 1/2007 |
|---|---|---|
| JP | 2005-050224 | 2/2005 |
| WO | 2005/055034 | 6/2005 |
| WO | 2007071027 | 6/2007 |

OTHER PUBLICATIONS

The State Intellectual Property Office of the People's Republic of China Application Serial No. 201110098304.2, Office Action dated Nov. 1, 2013, 6 pages.
Frakes, "Hands on with iOS 4 folders," Macworld, XP-002726352, Jun. 2010, 8 pages.
Pogue, "iPhone: The Missing Manual, Fourth Edition," XP55042248, Aug. 2010, 58 pages.
European Patent Office Application Serial No. 11171863.1, Search Report dated Jul. 11, 2014, 7 pages.

* cited by examiner

*Primary Examiner* — Phuoc H Doan
(74) *Attorney, Agent, or Firm* — Lee, Hong, Degerman, Kang & Waimey

(57) ABSTRACT

A mobile terminal is provided. According to one embodiment, the mobile terminal includes: a display for displaying a folder icon corresponding to at least one application; a communication unit for receiving update information corresponding at least partially to the at least one application; and a controller for controlling the display to display the folder icon and, upon receipt of the update information by the communication unit, for controlling the display to display a graphical object indicating the receipt of the update information and corresponding to the folder icon.

18 Claims, 19 Drawing Sheets

MOBILE TERMINAL AND METHOD OF MANAGING DISPLAY OF AN ICON IN A MOBILE TERMINAL

Pursuant to 35 U.S.C. §119(a), this application claims the benefit of earlier filing date and right of priority to Korean Patent Application No. 10-2010-0085317 filed on Sep. 1, 2010, the entire contents of which are incorporated by reference herein.

FIELD

Embodiments of the present invention relate to a mobile terminal, and more particularly, to a mobile terminal, which efficiently manages display of an icon and creates a folder comprising a plurality of icons to perform various operations related to the icons and the folder, and to a method of managing display of an icon in the mobile terminal.

RELATED ART

A mobile terminal, e.g., a handheld phone, may be equipped with various applications, which are supported by the rapid development of hardware and software. These various applications may be displayed and represented by graphical objects, such as icons. And, a user can access the applications or receive various types of information through the graphical objects.

The greater the number of various and complicated applications a mobile terminal has, the more a user interface (UI) for managing corresponding icons more efficiently is needed. Also, there is a need to develop a technology to provide information to a user via the user interface in a diverse and effective way.

SUMMARY

Aspects of the present invention are directed toward providing a mobile terminal, which efficiently manages display of an icon and creates a folder comprising a plurality of icons to perform various operations related to the icon and the folder, and a method of managing display of an icon in a mobile terminal.

According to one embodiment, a mobile terminal includes: a display for displaying a folder icon corresponding to at least one application; a communication unit for receiving update information corresponding at least partially to the at least one application; and a controller for controlling the display to display the folder icon and, upon receipt of the update information by the communication unit, for controlling the display to display a graphical object indicating the receipt of the update information and corresponding to the folder icon.

According to one embodiment, a mobile terminal includes: a touchscreen for displaying a plurality of icons comprising a first icon and a second icon; and a controller for controlling the touchscreen to display the plurality of icons, and for creating a folder icon and controlling the touchscreen to display the folder icon if the controller detects a touch action maintained for at least a predetermined time period and correlating the first icon and the second icon with each other.

According to one embodiment, a method of managing display of an icon in a mobile terminal includes: displaying, by a display, a folder icon corresponding to at least one application; receiving, by a communication unit, update information corresponding at least partially to the at least one application; and controlling, by a controller upon receipt of the update information by the communication unit, the display to display a graphical object indicating the receipt of the update information and corresponding to the folder icon.

According to one embodiment, a method of managing display of an icon in a mobile terminal includes: creating a folder comprising a plurality of icons; displaying a folder icon corresponding to the created folder; displaying at least one of the plurality of icons upon receiving a first touch action of the displayed folder icon; deleting a selected icon from the folder upon receiving a second touch action for selecting the icon from the plurality of icons; and displaying a graphical object representing update information in or around the displayed folder icon upon receiving the update information corresponding to at least one of the plurality of icons.

According to embodiments of the present invention, the mobile terminal and the method of controlling display of an icon in the mobile terminal can more efficiently manage display of various icons corresponding to various kinds of applications provided by the mobile terminal and can more effectively create a folder comprising a plurality of icons to perform various operations related to the icons and the folder.

BRIEF DESCRIPTION OF THE DRAWINGS

The implementation of this document will be described in detail with reference to the following drawings in which like numerals refer to like elements.

DETAILED DESCRIPTION

Figure 1:
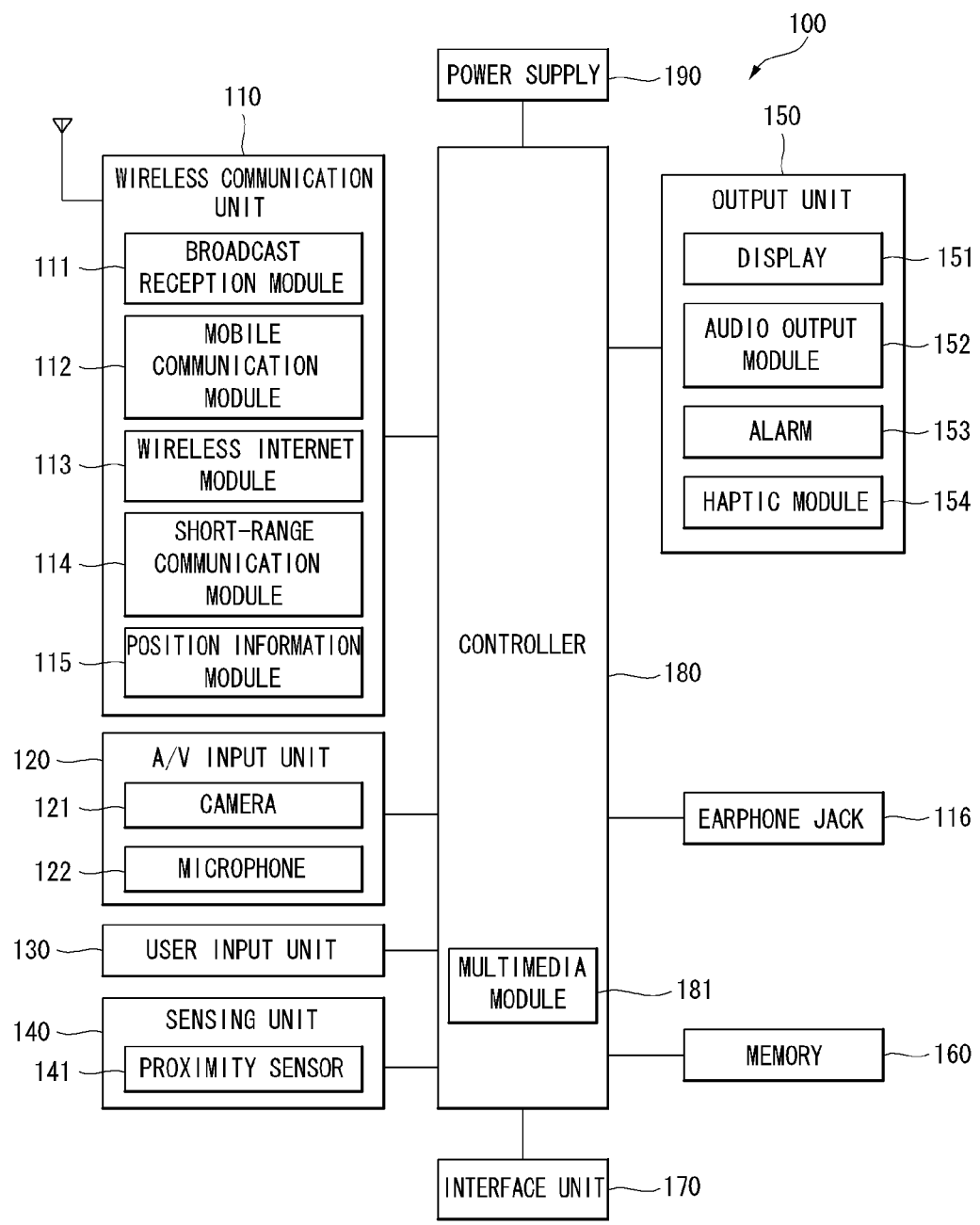
FIG. 1 is a block diagram of a mobile terminal according to one embodiment of the present invention.

The above and other aspects, features and advantages of the present invention will be more apparent from the following detailed description taken in conjunction with the accompanying drawings. Hereinafter, embodiments of the present invention will be described in detail with reference to the attached drawings. Like reference numerals refer to like elements throughout the specification. In describing embodiments of the present invention, detailed description of well-known functions or configurations will not be provided, in order to provide greater focus on features of embodiments of the present invention.

A mobile terminal according to embodiments of the present invention will be described in more detail with reference to the drawings. The suffixes 'module', 'unit' and 'part' may be used to describe certain elements. Significant meanings or roles should not be given to the suffixes themselves, and it is understood that the suffixes 'module', 'unit' and 'part' may be used together or interchangeably.

Examples of mobile terminals described herein may include mobile phones, smart phones, laptop computers, digital broadcast terminals, personal digital assistants (PDAs), portable multimedia players (PMP) and/or navigators.

FIG. 1 is a block diagram of a mobile terminal according to one embodiment of the present invention. The mobile terminal 100 includes a wireless communication unit 110, an audio/video (A/V) input unit 120, a user input unit 130, a sensing unit 140, an output unit 150, a memory 160, an interface unit 170, a controller 180 and a power supply 190. It is not essential that the mobile terminal include all components illustrated in FIG. 1. It is understood that more or fewer components may be implemented according to various embodiments.

The wireless communication unit 110 includes one or more modules for allowing wireless communication between the mobile terminal 100 and a wireless communication system or between networks in which mobile terminals 100 are positioned. For example, the wireless communication unit 110 may include at least a broadcast reception module 111, a mobile communication module 112, a wireless Internet module 113, a short-range communication module 114, or a position information module 115.

The broadcast reception module 111 receives a broadcast signal and/or broadcast-related information from an external broadcast management server through a broadcast channel. The broadcast channel includes a satellite channel and/or a terrestrial channel. The broadcasting management server is a server for generating and transmitting a broadcast signal and/or broadcast-related information, or a server for receiving the generated broadcast signal and/or the broadcast-related information and transmitting the generated broadcast signal and/or the broadcast-related information to the terminal. A broadcast signal and/or broadcast-related information received through the broadcast reception module 111 may be stored in the memory 160.

The broadcast signal may include a TV broadcast signal, a radio broadcast signal, or a data broadcast signal, and may further include a broadcast signal obtained by combining a data broadcast signal into a TV broadcast signal or a radio broadcast signal.

Examples of broadcast-related information may include information related to a broadcast channel, a broadcast program, or a broadcast service provider. The broadcast-related information may be provided via a mobile communication network. In this case, the broadcast-related information may be received by the mobile communication module 112.

The broadcast-related information may exist in various forms. For example, the broadcast-related information may exist in the form of an electronic program guide (EPG) of digital multimedia broadcasting (DMB), or an electronic service guide (ESG) of digital video broadcast-handheld (DVB-H).

The broadcast reception module 111 receives a broadcast signal using various broadcasting systems and may receive a digital broadcast signal using a digital broadcasting system such as Digital Multimedia Broadcasting-Terrestrial (DMB-T), Digital Multimedia Broadcasting-Satellite (DMB-S), Media Forward Link Only (MediaFLO), Digital Video Broadcast-handheld (DVB-H), Convergence of Broadcasting and Mobile Service (DVB-CBMS), China Multimedia Mobile Broadcasting (CMMB), Mobile Broadcasting Business Management System (MBBMS), and Integrated Services Digital Broadcast-Terrestrial (ISDB-T). The broadcast reception module 111 may be suitably configured to receive a broadcast signal from other broadcasting systems as well as the above-described digital broadcasting systems.

The mobile communication module 112 transmits and receives radio signals to and from at least a base station, an external terminal, or a server over a mobile communication network. Such radio signals may include a voice call signal, a video call signal or various types of data signals corresponding to text/multimedia message transmission and reception.

The wireless Internet module 113 refers to a module for facilitating wireless Internet access. The wireless Internet module 113 may be internally or externally coupled to the mobile terminal 100. The wireless Internet technologies facilitated may include WLAN (Wireless LAN) Wi-Fi, WiBro™ (Wireless broadband), WIMAX™ (World Interoperability for Microwave Access), and HSDPA (High Speed Downlink Packet Access).

The short-range communication module 114 refers to a module for facilitating short-range communication. Short-range communication technologies that are used may include Bluetooth™, radio frequency identification (RFID), infrared data association (IrDA), ultra-wideband (UWB), or Zig-Bee™.

The position information module 115 is a module for identifying or otherwise obtaining a position of the mobile terminal 100. The position information module 115 may acquire position information using a global navigation satellite system (GNSS). Here, GNSS refers to radio navigation satellite systems that orbit the earth and transmit reference signals so that the location of certain types of radio navigation receivers on the earth's surface can be determined or approximated. GNSS includes a global positioning system (GPS) managed by the USA, Galileo managed by Europe, global orbiting navigational satellite system (GLONASS) managed by Russia, COMPASS managed by China, and quasi-zenith satellite system (QZSS) managed by Japan.

According to one embodiment, the position information module 115 may be a GPS (Global Positioning System) module. The GPS module 115 may calculate information regarding distances between one point (object) and at least three satellites and information regarding the time when the distance information is measured, and use the obtained distance information to triangulate three-dimensional position information on the point (object) according to latitude, longitude and altitude at a predetermined time. Moreover, the GPS module 115 may calculate position and time information using three satellites and correct the calculated position and time information using another satellite. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes (or produces) image frames of still images or moving images obtained by an image sensor in a video call mode or a photography mode. Further, the processed image frames can be displayed on a display 151.

The image frames processed by the camera 121 can be stored in the memory 160 or transmitted to an external device through the wireless communication unit 110. Two or more cameras 121 may be provided according to one embodiment of the mobile terminal 100.

The microphone 122 receives an external audio signal in a call mode, a recording mode or a voice recognition mode and processes the received audio signal into electronic audio data.

The processed audio data can then be converted into a form that can be transmitted (output) to a mobile communication base station through the mobile communication module 112 in the call mode. Further, the microphone 122 may employ various noise removal algorithms for removing noise generated when the external audio signal is received.

The user input unit 130 generates input data for controlling the operation of the terminal by a user. The user input unit 130 may include a keypad, a dome switch, a touch pad (e.g., constant voltage/capacitance), a jog wheel, or a jog switch.

The sensing unit 140 senses the current state of the mobile terminal 100, such as an open/closed state of the mobile terminal 100, the position of the mobile terminal 100, whether the user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether the mobile terminal 100 is opened or closed when the mobile terminal 100 is a slide phone. In addition, the sensing unit 140 can sense whether the power supply 190 supplies power and whether the interface unit 170 is connected to an external device. According to one embodiment, the sensing unit 140 may include a proximity sensor 141.

The output unit 150 may generate an output relevant to the sense of sight, hearing, and/or touch. The output unit 150 may include a display 151, an audio output module 152, an alarm 153, and/or a haptic module 154.

The display 151 may display (output) information processed by the mobile terminal 100. For example, if the terminal is in a call mode, the display 151 may display a user interface (UI) or a graphic user interface (GUI) associated with the call. If the mobile terminal 100 is in a video call mode or a photography mode, the display 151 may display a photographed and/or received picture, a UI, or a GUI.

The display 151 may include at least a liquid crystal display (LCD), a thin film transistor liquid crystal display (TFT LCD), an organic light-emitting diode (OLED), a flexible display, or a 3-dimensional display.

The display 151 may have a transparent or a light-transmissive type configuration to enable an external environment to be viewed. This may be called a transparent display. A transparent LCD may be an example of a transparent display. A backside structure of the display 151 may also have the light-transmissive type configuration. In this configuration, a user may see an object located behind the terminal body on a portion of the display 151 of the terminal body.

At least two or more displays 151 may be provided in the mobile terminal 100 according to one embodiment. For example, a plurality of displays may be provided to be spaced apart from each other or to form a single body on a single face of the terminal 100. Alternatively, a plurality of displays may be provided on different faces of the terminal 100.

If the display 151 and a sensor for detecting a touch action (hereinafter, a touch sensor) are constructed in a mutual-layered structure (hereinafter, a touch screen), the display 151 may be used as an input device as well as an output device. For example, the touch sensor may include a touch film, a touch sheet, and/or a touchpad.

The touch sensor may convert a pressure applied to a specific portion of the display 151 or a variation of electrostatic capacitance generated from a specific portion of the display 151 to an electric input signal. The touch sensor may detect pressure of a touch as well as a position and size of the touch.

If a touch input is provided to the touch sensor, a signal(s) corresponding to the touch input may be transferred to a touch controller (not shown). The touch controller may process the signal(s) and then transfer corresponding data to the controller 180. Therefore, the controller 180 may be made aware of which portion of the display 151 is touched.

Referring to FIG. 1, a proximity sensor 141 can be provided in an area of the mobile terminal 100 enclosed by the touch screen or around the touch screen. The proximity sensor may detect a presence or absence of an object approaching a prescribed detecting surface or an object existing (or located) around the proximity sensor using an electromagnetic field strength or infrared ray without mechanical contact. The proximity sensor 141 may be more durable than a contact type sensor and may also have a broader utility than the contact type sensor.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor.

If the touch screen is an electrostatic type, it may detect the proximity of a pointer using a variation of an electric field according to the proximity of the pointer. In this configuration, the touch screen (touch sensor) may be classified as the proximity sensor 141.

For convenience of description, an action in which a pointer approaches the touch screen without contacting the touch screen is referred to as a proximity touch, and an action in which a pointer actually touches the touch screen is referred to as a contact touch. The location of the touch screen proximity-touched by the pointer may be the position of the pointer that vertically opposes the touch screen when the pointer performs the proximity touch.

The proximity sensor may detect a proximity touch and/or a proximity touch pattern (e.g., a proximity touch distance, a proximity touch duration, a proximity touch position, a proximity touch shift state). Information corresponding to the detected proximity touch action and/or the detected proximity touch pattern may be output to the touch screen.

The audio output module 152 may output audio data that is received from the wireless communication unit 110 in a call signal reception mode, a call mode, a recording mode, a voice recognition mode, and a broadcast receiving mode. The audio output module 152 may output audio data stored in the memory 160. The audio output module 152 may output an audio signal relevant to a function (e.g., call received, message received) performed by the mobile terminal 100. The audio output module 152 may include a receiver, a speaker, and/or a buzzer. Furthermore, the audio output module 152 can output sound through an earphone jack 116. The user can connect earphones to the earphone jack 116 and hear the output sound.

The alarm 153 may output a signal for announcing occurrence of an event associated with the mobile terminal 100. An event occurring in the mobile terminal 100 may include a call reception, a message reception, a key signal input, and/or a touch input. The alarm 153 may output a signal for announcing an event occurrence by way of vibration as well as a video signal or an audio signal. The video signal may be output via the display 151. The audio signal may be output via the audio output module 152.

The haptic module 154 may bring about various haptic effects that can be sensed by a user. Vibration is a representative example of a haptic effect brought about by the haptic module 154. The strength and pattern of the vibration generated from the haptic module 154 may be controllable. For example, vibrations differing from each other may be output in a manner of being synthesized together or may be sequentially output.

The haptic module 154 may generate various haptic effects including a vibration, an effect simulating a stimulus such as a pin array vertically moving against a contact skin surface, a jet of air via an outlet, a suction of air via an inlet, a skim on a skin surface, a contact of an electrode, or an electrostatic power, and/or an effect stimulating a sense of hot/cold using an endothermic or exothermic device as well as the vibration.

The haptic module 154 may provide the haptic effect via direct contact. The haptic module 154 may enable a user to experience the haptic effect via muscular sense of a finger and/or an arm. Two or more haptic modules 154 may be provided according to an embodiment of the mobile terminal 100.

The memory 160 may store a program for operations of the controller 180. The memory 160 may temporarily store input/output data (e.g., phonebook, message, still picture, moving picture). The memory 160 may store data of vibration and sound in various patterns output to the touch screen in response to a touch input.

The memory 160 may include at least a flash memory, a hard disk, a multimedia card micro type memory, a card type memory (e.g., SD memory, XD memory), a random access memory (RAM), a static random access memory (SRAM), a read-only memory (ROM), an electrically erasable programmable read-only memory, a programmable read-only memory, a magnetic memory, a magnetic disk or an optical disk. The mobile terminal 100 may operate in association with a web storage that performs a storage function of the memory 160 on the Internet.

The interface unit 170 may play a role as a passage to external devices connected to the mobile terminal 100. The interface unit 170 may receive data from an external device. The interface unit 170 may be supplied with a power and then deliver the power to elements within the mobile terminal 100. The interface unit 170 may enable data from within the mobile terminal 100 to be provided to an external device. The interface unit 170 may include a wire/wireless headset port, an external charger port, a wire/wireless data port, a memory card port, a port for coupling to a device having an identity module, an audio input/output (I/O) port, a video input/output (I/O) port, and/or an earphone port.

The identity module may be a chip or card that stores various kinds of information for authenticating use of the mobile terminal 100. The identity module may include a user identity module (UIM), a subscriber identity module (SIM), and/or a universal subscriber identity module (USIM). A device provided with the above identity module (hereafter, an identity device) may be manufactured in the form of a smart card. The identity device may be connected to the mobile terminal 100 via the corresponding port.

The interface unit 170 may play a role as a passage for supplying a power to the mobile terminal 100 from a cradle that is connected to the mobile terminal 100. The interface unit 170 may play a role as a passage for delivering various command signals, which are input from a user to the mobile terminal 100 via the cradle. Various command signals input from the cradle or the power may serve as a signal for indicating that the mobile terminal 100 is correctly loaded in the cradle.

The controller 180 may control overall operations of the mobile terminal 100. For example, the controller 180 may perform control and processing relevant to a voice call, a data communication, and/or a video conference. The controller 180 may have a multimedia module 181 for multimedia playback. The multimedia module 181 may be implemented within the controller 180 or may be configured separately from the controller 180.

The controller 180 may perform pattern recognizing processing for recognizing a handwriting input performed on the touch screen as a character and/or recognizing a picture drawing input performed on the touch screen as an image.

The power supply 190 may receive an external or internal power and then supply the power required for operation of the various elements of the mobile terminal 100 under the control of the controller 180.

Embodiments of the present invention described in the following description may be implemented within a recording medium that can be read by a computer or a computer-like device using software, hardware or a combination of hardware and software.

According to a hardware implementation, arrangements and embodiments described herein may be implemented using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Some embodiments may be implemented using the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2:
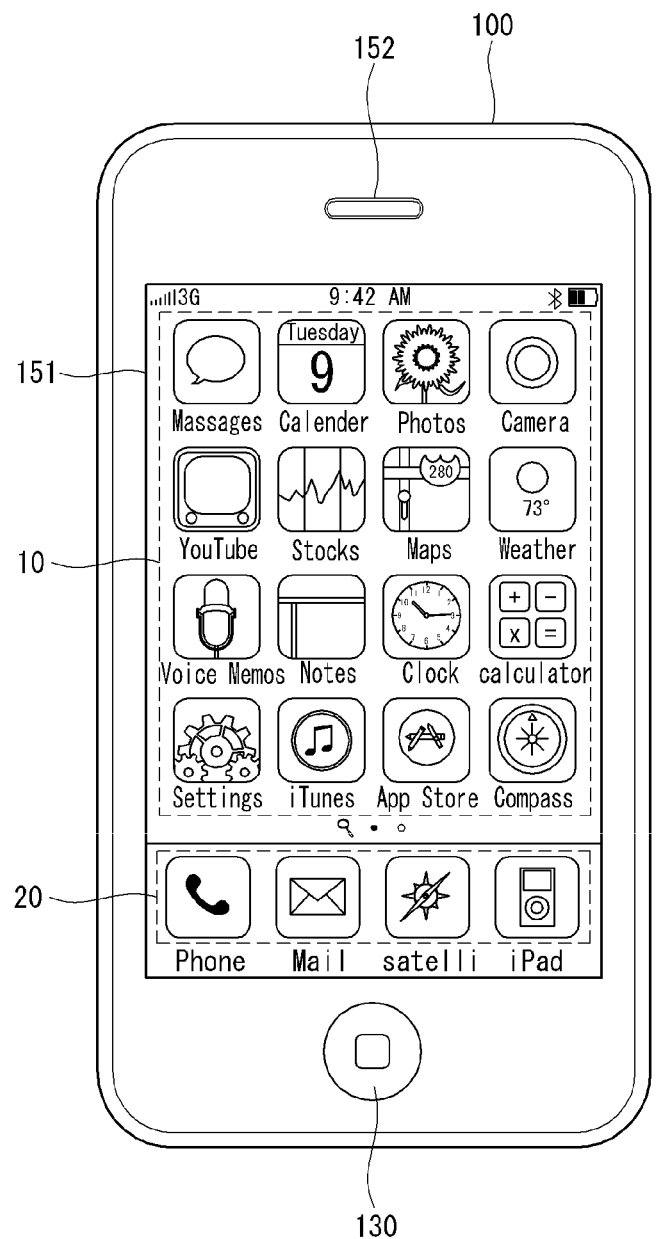
FIG. 2 illustrates an example of a screen display according to one embodiment of the present invention.

FIG. 2 illustrates a view of a screen according to an embodiment of the present invention. Referring to FIG. 2, the controller 180 may display (or cause the display 151 to display) a plurality of icons (e.g., icons in icon groups 10 and 20) on the display 151. The icons in a first icon group 10 may be edited by a user. For example, the user may delete or modify the icons included in the first icon group 10, and register a new icon in the first icon group 10. The controller 180 may also display on the display 151 a second icon group 20 that includes icons not editable by the user.

Operations involving the first icon group 10 will now be described in more detail. In the following description, for convenience of explanation, the display 151 of the mobile terminal 100 is implemented using a touch screen. As described earlier, the touch screen 151 can perform both an information display function and an information input function. However, it should be recognized that embodiments of the present invention are not limited thereto. Also, it should be understood that the term "touch" may refer to a "proximity touch" or a "contact touch."

Figure 3:
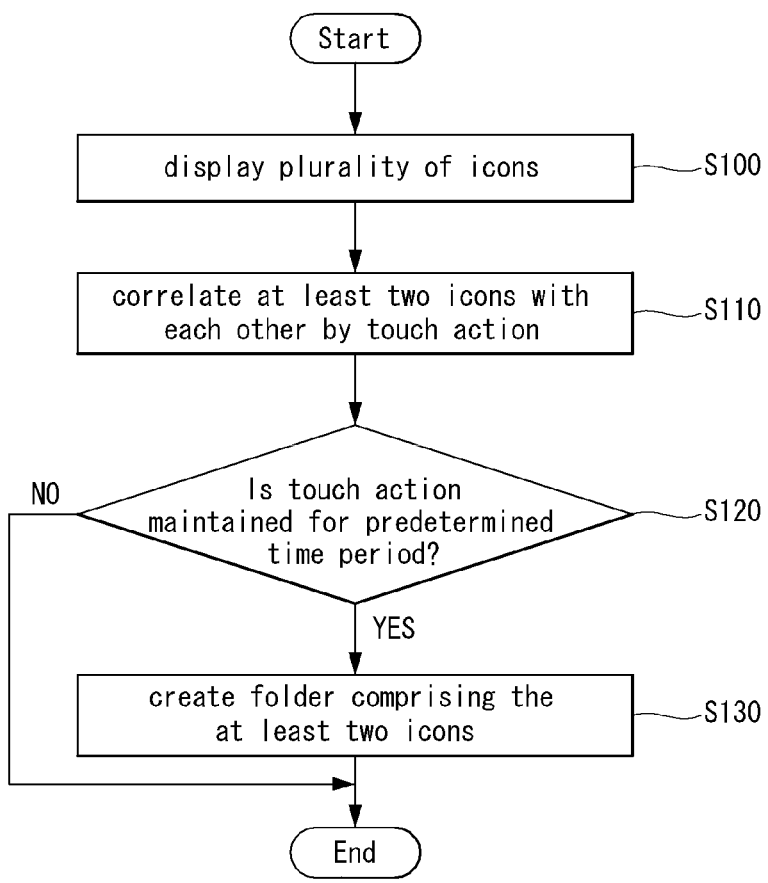
FIG. 3 is a flowchart of a method of controlling display of an icon in a mobile terminal according to an embodiment of the present invention.

FIG. 3 is a flowchart of a method of controlling display of an icon in a mobile terminal according to a first embodiment of the present invention. FIGS. 4 to 9 are views of a display that illustrate the display of an icon according to the first embodiment of the present invention (or related embodiments).

The method according to the first embodiment of the present invention may be implemented in the mobile terminal 100 described earlier with reference to FIG. 1. In the following description, the method according to the first embodiment of the present invention and the operation of the mobile terminal 100 performing the method will be described in detail with reference to corresponding drawings.

Referring to FIG. 3, the controller 180 may display a plurality of icons 10 on the touch screen 151 as shown in FIG. 2 (FIG. 3, S100). Each of the plurality of icons 10 corresponds to a respective application. Applications corresponding to at least some of the plurality of icons 10 may automatically receive update information from a source external to the mobile terminal 100. An icon corresponding to an application that automatically receives the update information is often referred to as a widget.

For example, various widgets may be provided by the mobile terminal 100, such as a weather widget that receives weather information and provides it to a user, a stocks widget that receives stocks information and provides it to a user, and a news widget that receives and provides news information.

The controller 180 may correlate at least two of the plurality of icons 10 in response to a particular touch action received through the touchscreen 151 (FIG. 3, S110). Various examples of the particular touch action will be described later with reference to the drawings. The controller 180 determines whether the particular touch action is maintained for a predetermined time period (FIG. 3, S120). If the particular touch action is maintained for the predetermined time period, a folder (or folder icon) comprising at least two correlated icons may be created (FIG. 3, S130).

The operations of S110, S120 and S130 of FIG. 3 will now be described in more detail with reference to various drawings. As will be described, if a first touch on a first icon 11 is moved to a second icon 12, or the first touch and a second touch on the second icon 12 occur simultaneously (or concurrently), the controller 180 may correlate the first icon 11 and the second icon 12 with each other.

Figure 4:
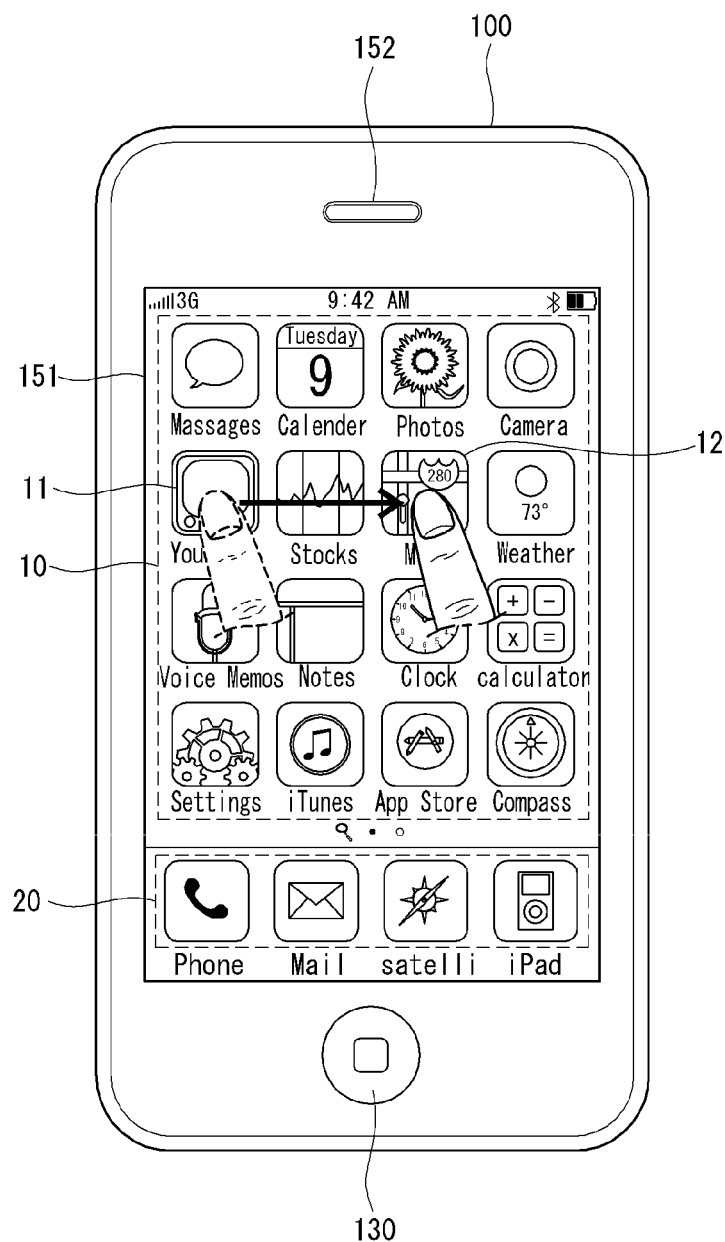
FIGS. 4 to 9 illustrate examples of screen displays for illustrating the method of FIG. 3.

For example, referring to FIG. 4, if the user touches the first icon 11 with a finger and then moves (e.g., drags) the finger to a position at which the second icon 12 is displayed, the controller 180 may correlate the first icon 11 and the second icon 12 with each other (FIG. 3, S110). When the first touch is moved to the second icon 12, if it is determined that the first touch is maintained on the second icon 12 for the predetermined time period, the controller 180 may create the first folder 30.

Figure 5:
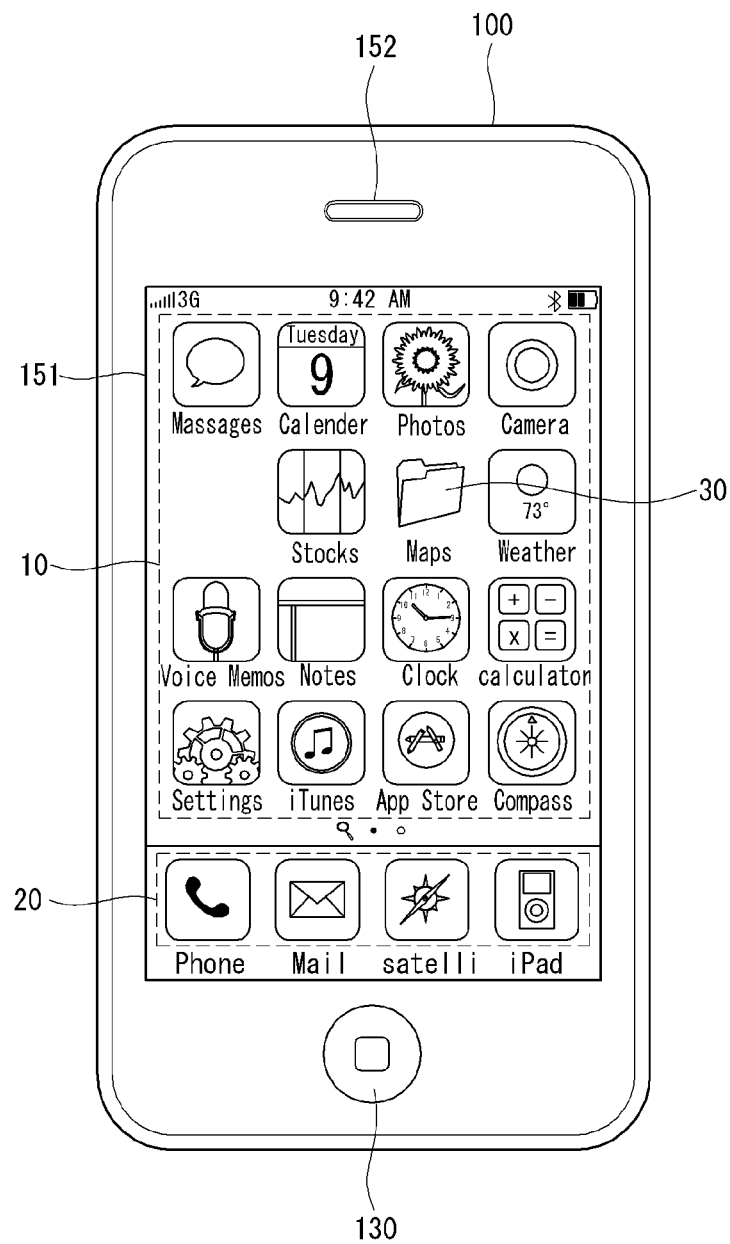

For example, if it is determined that the user maintains the touch on the second icon 12 for the predetermined time period after moving the finger to the second icon 12 (FIG. 3, S120), the controller 180 may create and display the first folder (or folder icon) 30 shown in FIG. 5 (FIG. 3, S130). The first folder 30 comprises the first icon 11 and the second icon 12. In the course of creating and displaying the first folder 30, the controller 180 may stop displaying the first icon 11 and the second icon 12 on the touch screen 151.

In addition, in a similar manner, the first folder 30 may be created when the user touches the second icon 12 and then moves his finger to the first icon 11. In this case, however, the position where the first folder 30 is created and displayed may be the position where the first icon 11 had been displayed.

Figure 6:
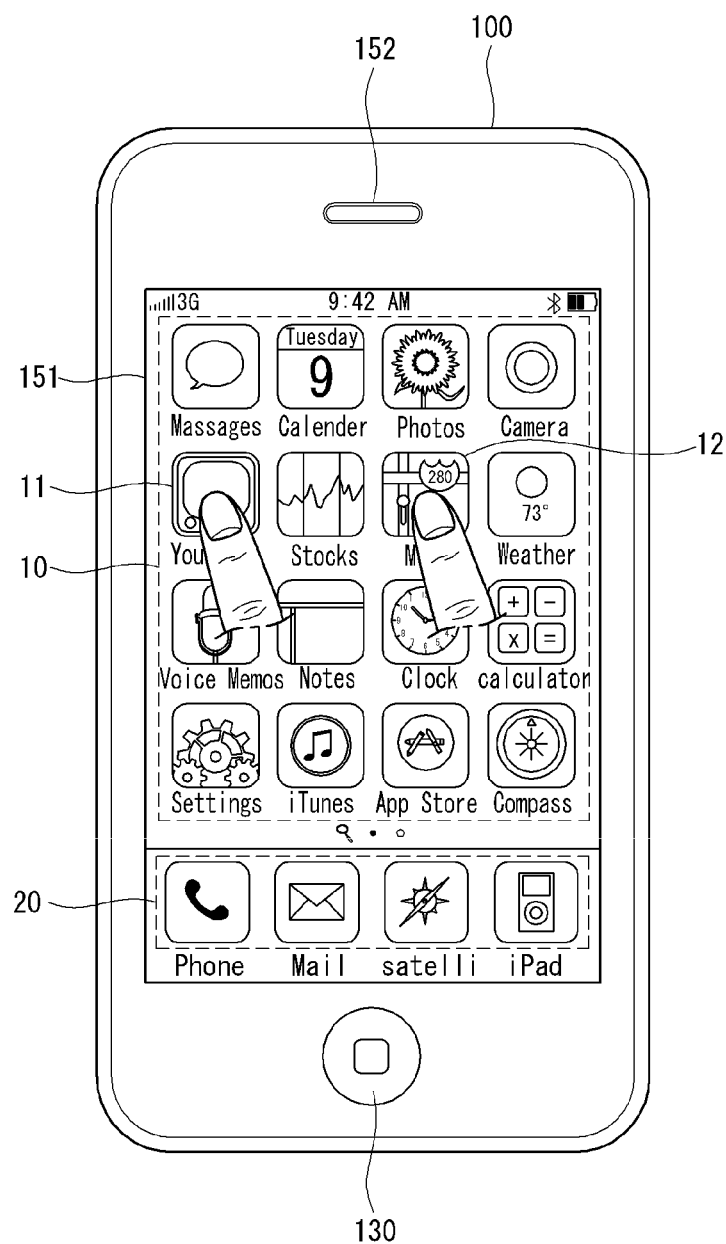

As another example, referring to FIG. 6, the user may touch the first icon 11 and the second icon 12 simultaneously. This may be another example of a particular touch action that causes the controller 180 to correlate the two icons (FIG. 3, S110). After the first icon 11 and the second icon 12 are simultaneously touched, if it is determined that the touch of the first icon 11 and the touch of the second icon 12 are maintained for the predetermined time period (FIG. 3, S120), the controller 180 may create and display the first folder 30 shown in FIG. 5 (FIG. 3, S130).

Figure 7:
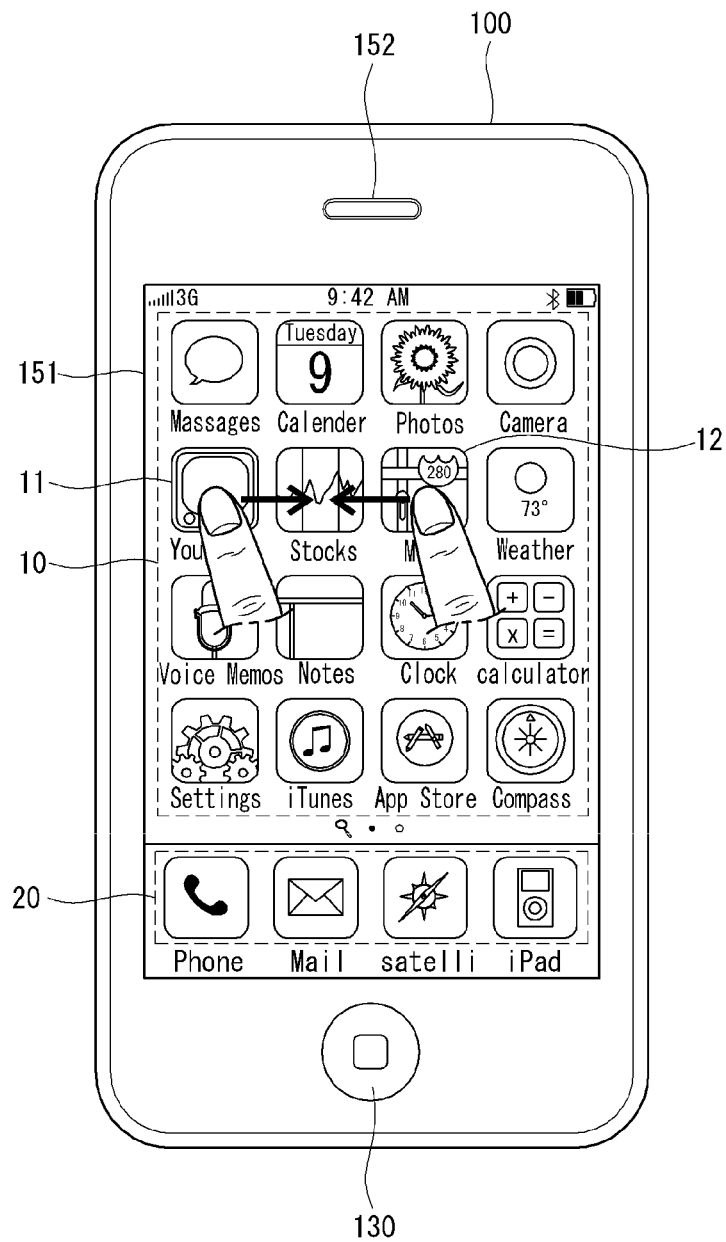

As another example, referring to FIG. 7, if the user touches the first icon 11 and the second icon 12 simultaneously, the controller 180 may correlate the two icons (FIG. 3, S110). If the user then moves the two fingers to a middle position (e.g., a position between the two icons 11, 12), the controller 180 may create and display the first folder 30 comprising the first icon 11 and the second icon 12 (FIG. 3, S130).

Therefore, when the first touch (the touch of the first icon 11) and the second touch (the touch of the second icon 12) occur simultaneously, if the first touch and the second touch are maintained at their respective touch points for the predetermined time period, or if the first touch and the second touch are moved (or dragged) to another touch point, the controller 180 may create the first folder 30.

With reference to FIG. 7, the controller 180 correlates the first icon 11 and the second icon 12 when the first icon 11 and the second icon 12 are simultaneously touched, and creates the first folder 30 when the touch of the first icon 11 and the touch of the second icon 12 are moved toward a certain direction (e.g., toward an intermediary position located between the first icon 11 and the second icon 12) while being maintained for the predetermined time period.

Figure 8:
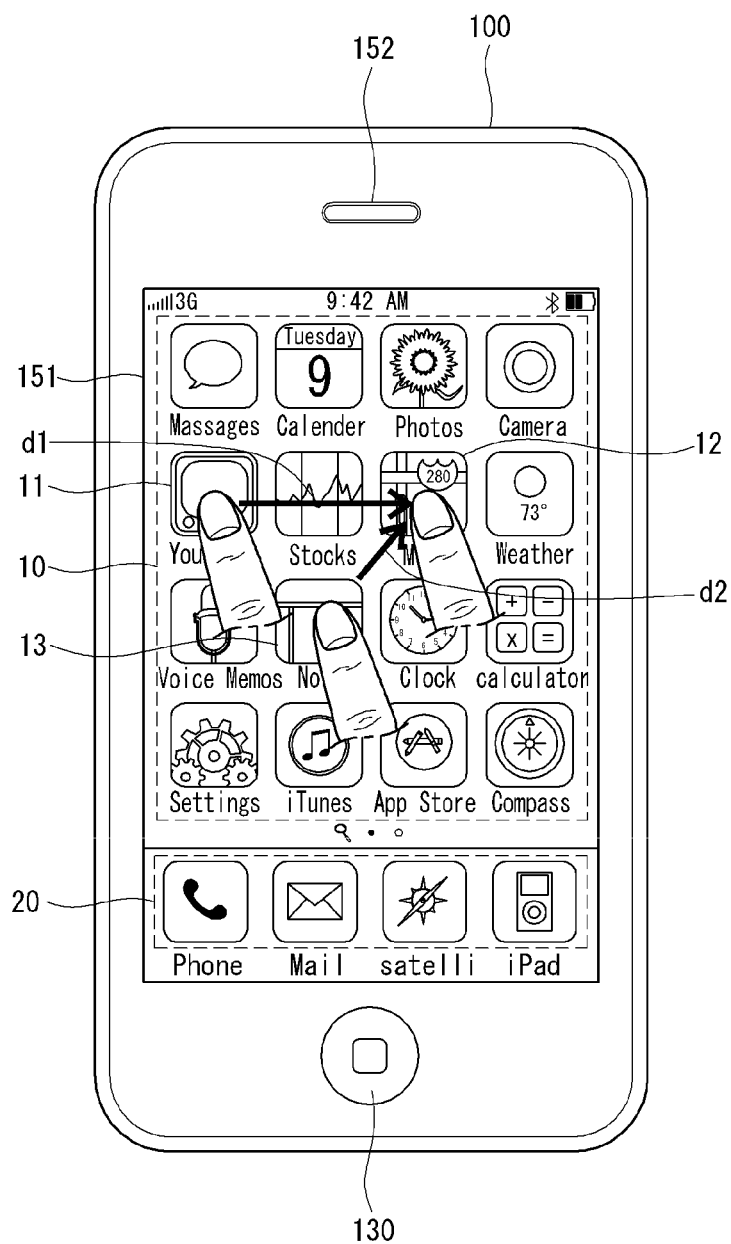

Referring to FIG. 8, a situation in which the user intends to include a third icon 13, as well as the first icon 11 and the second icon 12, in the same folder will be described.

Figure 9:
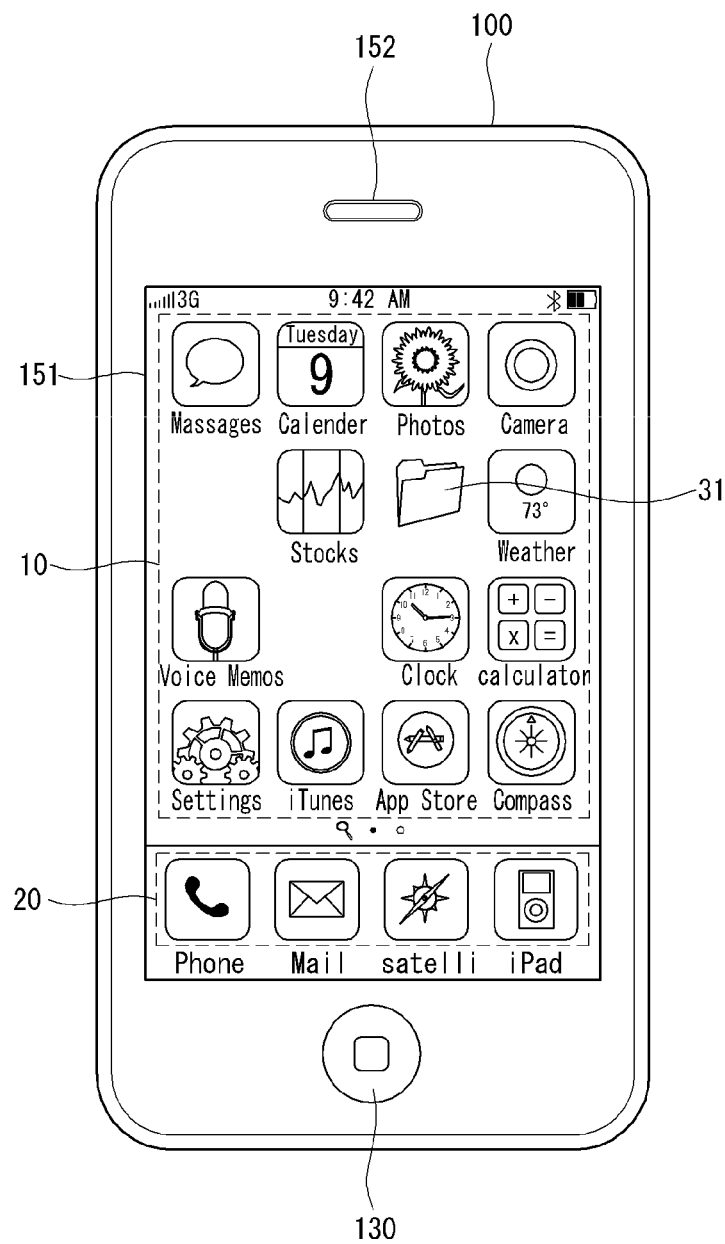

For example, with the second icon 12 being touched with a first finger and the touch of the first finger on the second icon 12 being maintained, when the user touches the first icon 12 with a second finger and then moves (d1) the touch on the first icon 12 to the direction of the second icon 12, and touches the third icon 13 with the second finger and then moves (d2) the touch on the third icon 13 to the direction of the second icon 12, the controller 180 may create a second folder 31 as shown in FIG. 9. The second folder 31 comprises the first icon 11, the second icon 12, and the third icon 13. In the case of creating and displaying the second folder 31, the controller 180 may delete (or cease display of) the icons 11, 12, and 13 on the touchscreen 151.

Figure 10:
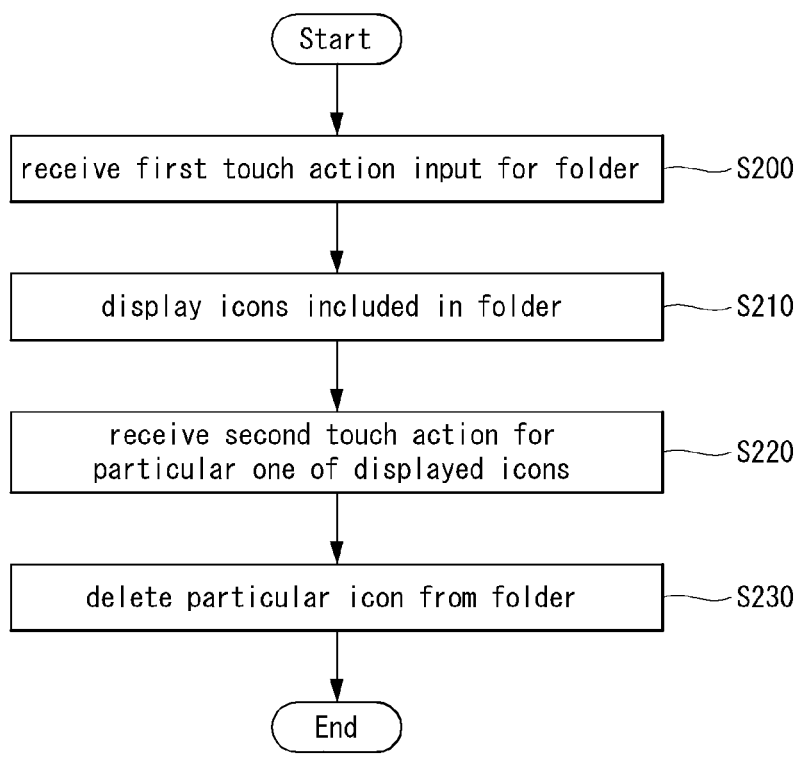
FIG. 10 is a flowchart of a method of controlling display of an icon in a mobile terminal according to an embodiment of the present invention.
Figure 11:
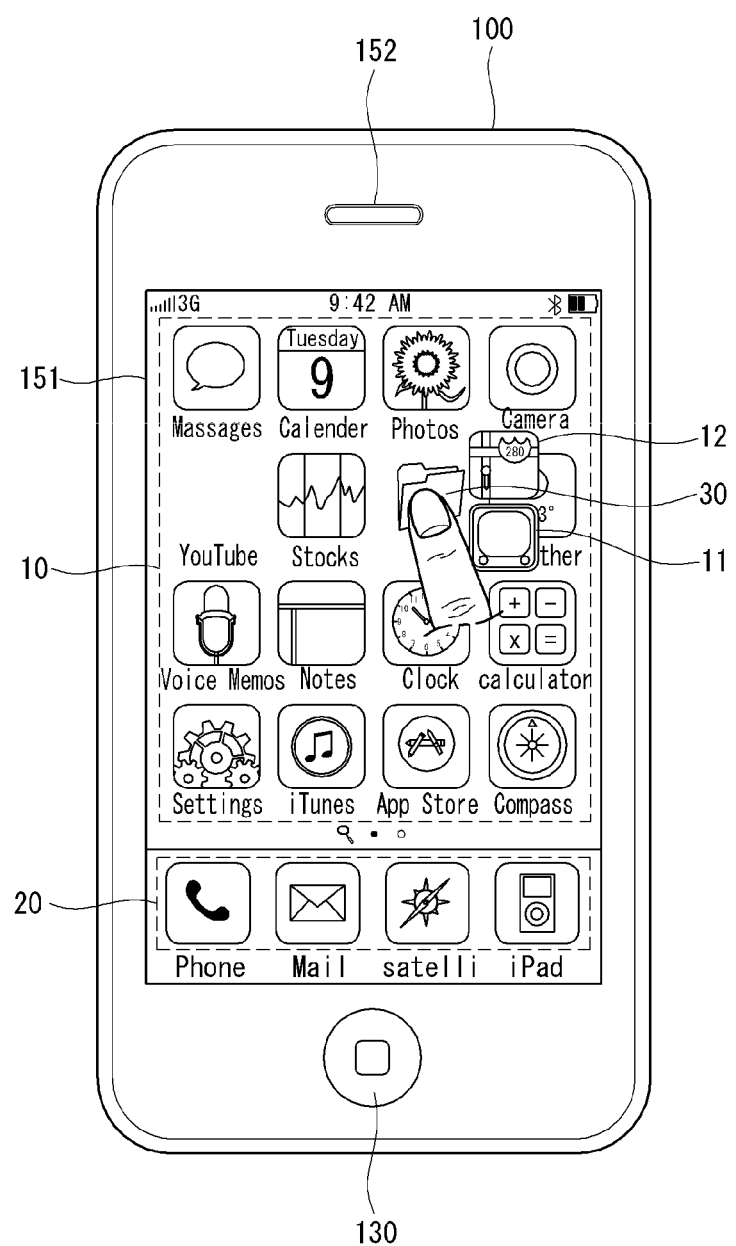
FIGS. 11 to 13 illustrate examples of screen displays for illustrating the method of FIG. 10.
Figure 12:
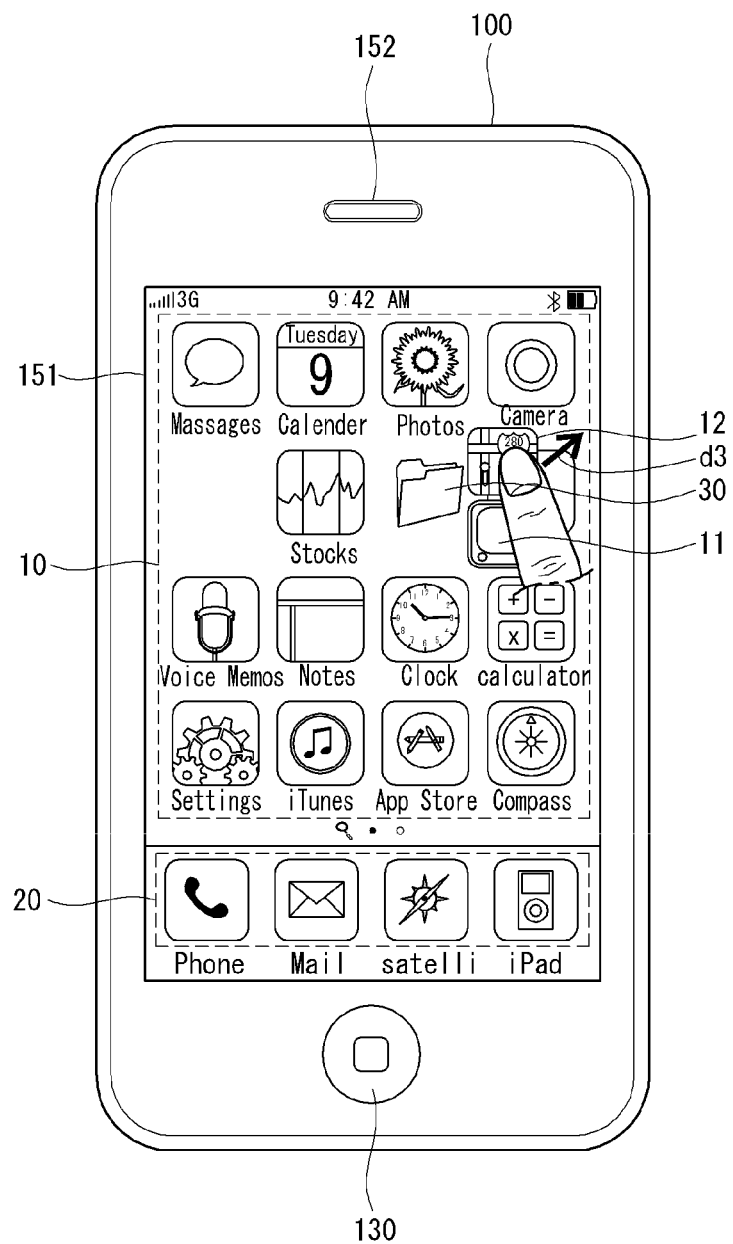
Figure 13:
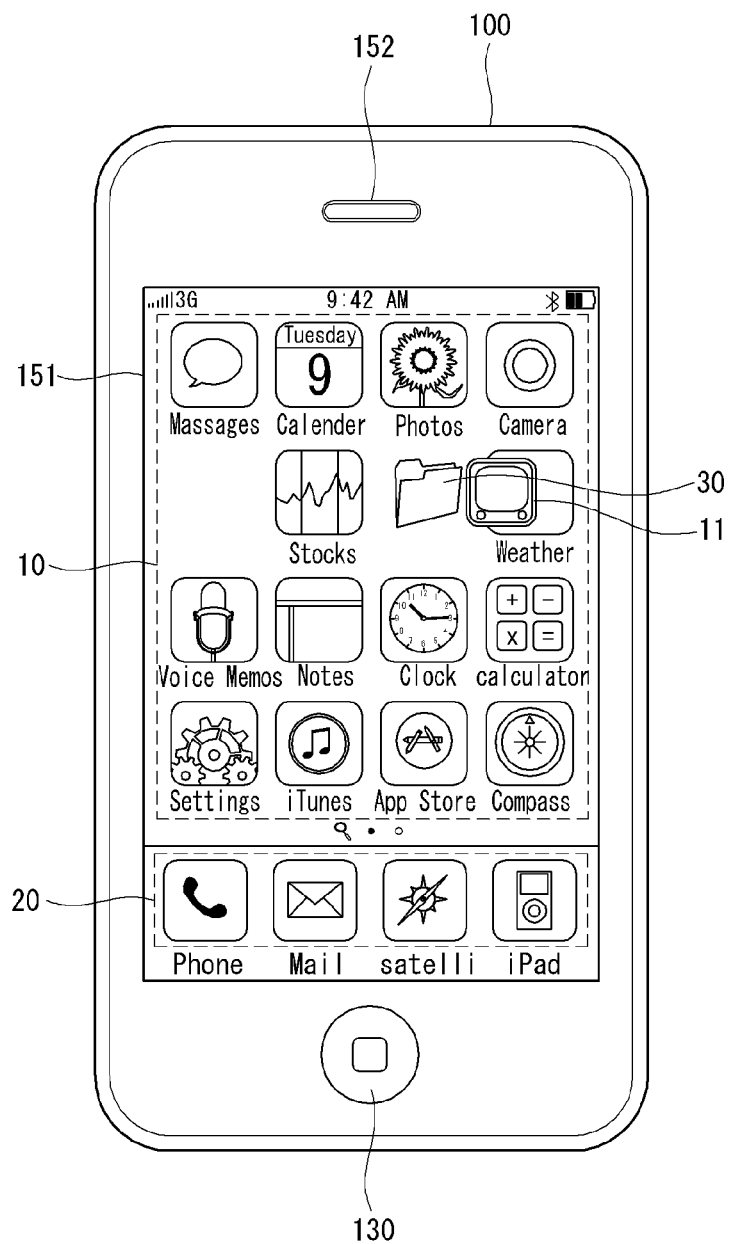

FIG. 10 is a flowchart of a method of controlling display of an icon in a mobile terminal according to another embodiment of the present invention. FIGS. 11 to 13 are views of screen displays for illustrating the method according to the above embodiment of the present invention, which may be implemented in the mobile terminal 100 described with reference to FIG. 1. In the following description, the method according to the above embodiment and the operation of the mobile terminal 100 implementing the method will be described in more detail.

Referring to FIG. 10, the controller 180 may receive a first touch action input for a particular folder displayed on the touchscreen 151 (FIG. 10, S200). For example, referring to FIG. 11, the user may touch the first folder 30 with a finger. The controller 180 may display icons included in the first folder 30 in response to the first touch action input (FIG. 10, S210). For example, with continued reference to FIG. 11, as the user touches the first folder 30, the first icon 11 and second icon 12 included in the first folder 30 may be displayed to correspond to the first folder 30.

The controller 180 may receive a second touch action input for a particular one of the displayed icons (FIG. 10, S220). For example, referring to FIG. 12, the user may touch the second icon 12 and then move (d3) the touch in a particular direction. The controller 180 may delete the particular icon 12 from the particular folder 30 in response to the second touch action input (FIG. 10, S230). For example, referring to FIG. 13, the controller 180 may delete the second icon 12 from the first folder 30 and leave only the first icon 11 in the first folder 30 in response to the touch movement made by the user as shown in FIG. 12. In FIGS. 11 and 13, when the user touches the first folder 30 again, the icon(s) displayed corresponding to the first folder 30 may disappear (or cease to be displayed).

Figure 14:
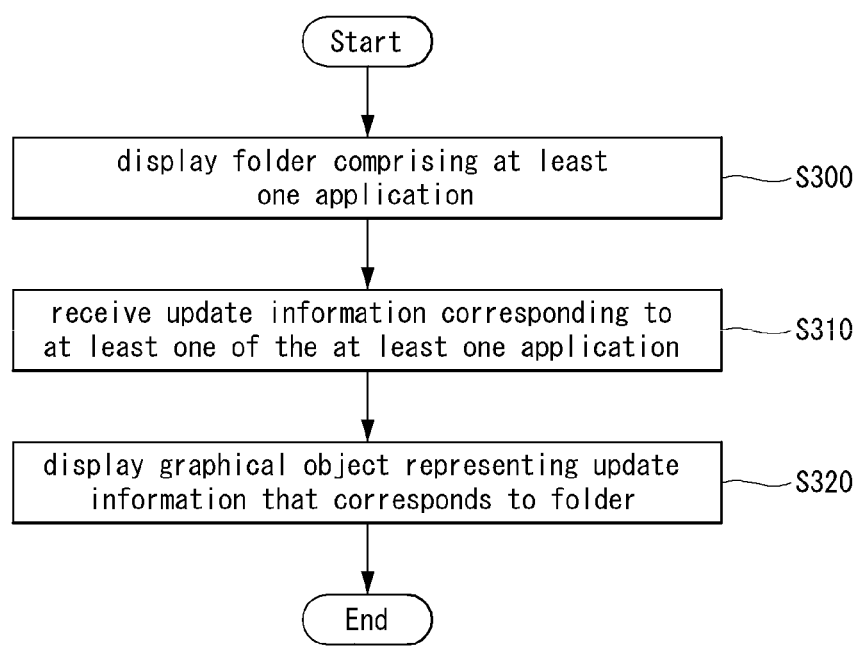
FIG. 14 is a flowchart of a method of controlling display of an icon in a mobile terminal according to an embodiment of the present invention.
Figure 15:
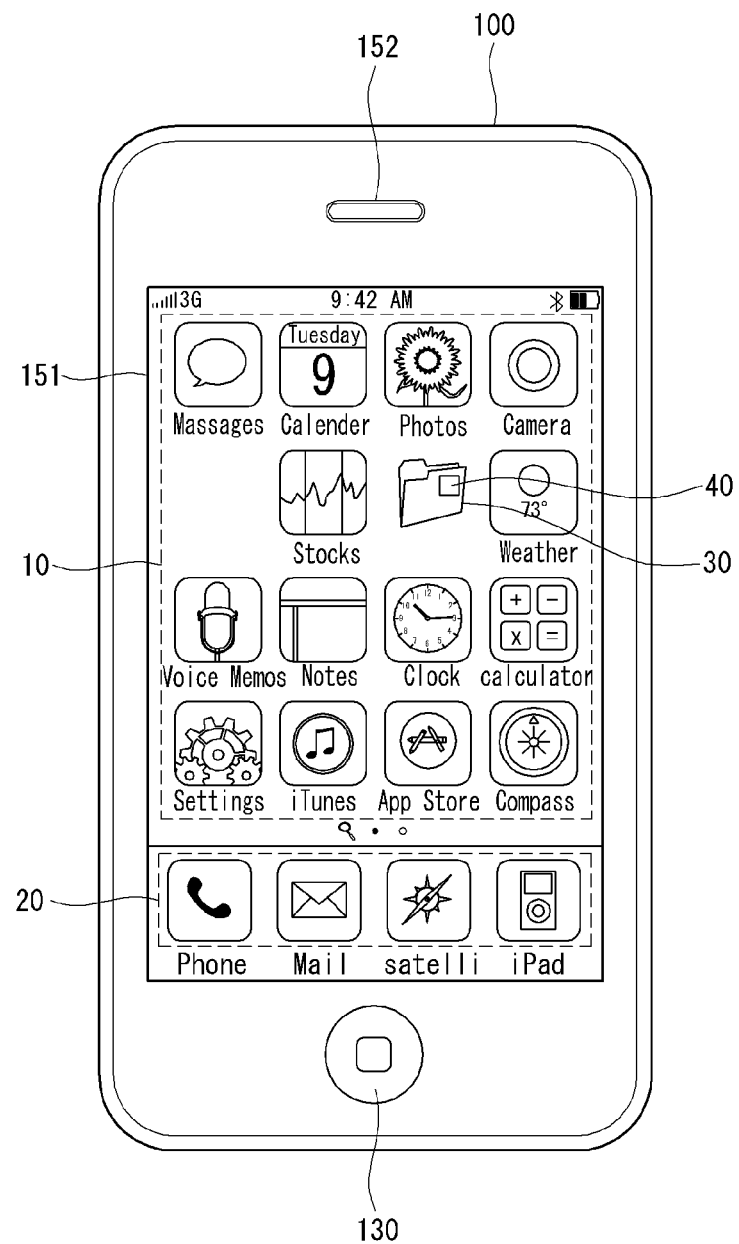
FIGS. 15 to 21 illustrate examples of screen displays for illustrating the method of FIG. 14.
Figure 16:
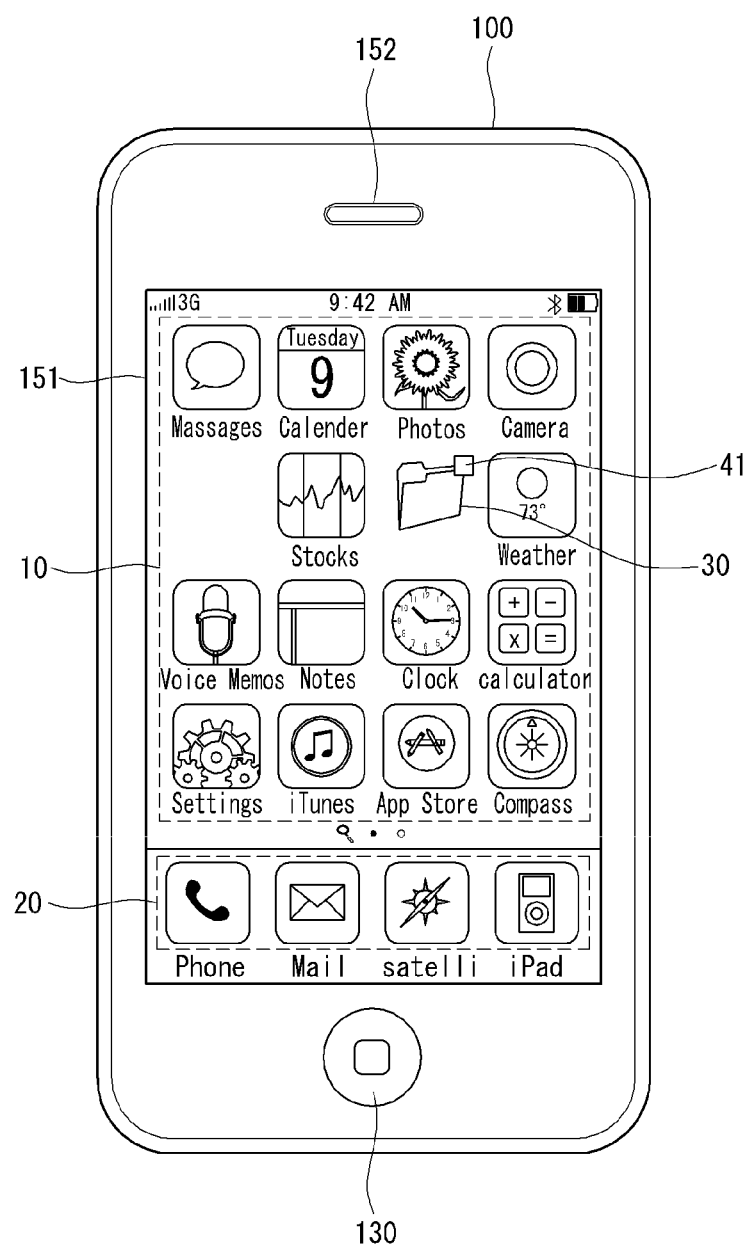

FIG. 14 is a flowchart of a method of controlling display of an icon in a mobile terminal according to another embodiment of the present invention. FIGS. 15 to 21 are views of screen displays for illustrating the method according to the above embodiment of the present invention, which may be implemented in the mobile terminal 100 described with reference to FIG. 1. In the following description, the method according to the above embodiment of the present invention and the operation of the mobile terminal 100 implementing the method will be described in more detail.

Referring to FIG. 14, the controller 170 may display a folder comprising at least one application on the touchscreen 151 (FIG. 14, S300). The controller 180 may receive update information corresponding at least partially to the at least one application through the wireless communication unit 110 (FIG. 14, S310). The update information may comprise at least first update information associated with a version upgrade of the corresponding application or second update information associated with content provided to the user. The controller 180 may receive update information pertaining to at least the first update information or the second update information for a particular application through the wireless communication unit 110.

The controller 180 may display a graphical object representing the update information on the touchscreen 151 such that the displayed graphical object corresponds to the folder (FIG. 14, S320). For example, referring to FIG. 15, a graphical object 40 representing the update information may be displayed on the first folder 30. Also, for example, referring to FIG. 16, the controller 180 may display the graphical object 41 representing the update information so as to partially overlap the first folder 30.

The controller 180 may display a graphical object (hereinafter, referred to as a "first graphical object") representing the first update information and a graphical object (hereinafter, referred to as a "second graphical object") representing the second update information) in different manners.

The first graphical object and the second graphical object may perform an indicator function to indicate the corresponding update information. For example, it is assumed that the first folder 30 comprises a weather application (weather widget) having a function of receiving weather information (e.g., from an external source) and providing it to the user, and a news application (news widget) with the function of receiving news information (e.g., from an external source) and providing it to the user.

Figure 17:
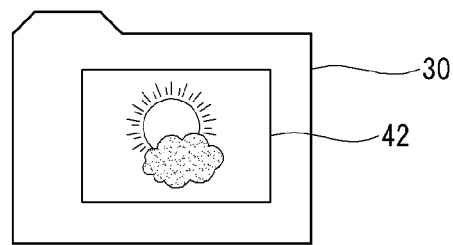

Upon receiving the latest weather information, as shown in FIG. 17, the controller 180 may display a weather image 42 as a graphical object to indicate the receipt of updated weather information. The weather image 42 may be displayed on (or in association with) the first folder 30. That is, upon receiving information pertaining to the second update information with respect to any of the applications included in the first folder 30, the controller 180 may display an image corresponding to the second update information on the first folder 30.

Figure 18:
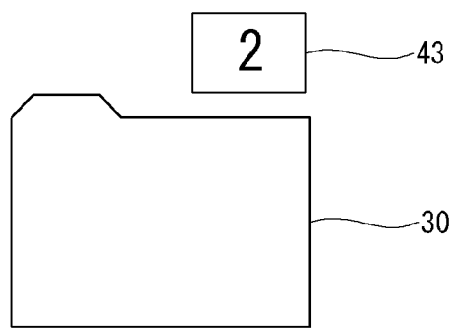

Upon receiving update information for version upgrades of the weather application and of the news application, as shown in FIG. 18, the controller 180 may notify the user of the receipt of the second update information for two of the applications included in the first folder 30 by displaying a box 43 showing the number "2" around (or in association with) the first folder 30. That is, upon receiving information pertaining to the first update information on the applications included in the first folder 30, the controller 180 may display the number of applications for which a version upgrade is available around the first folder 30.

As shown in FIGS. 17 and 18, the controller 180 may provide the first graphical object 43 corresponding to the first update information and the second graphical object 42 corresponding to the second update information in different manners. Accordingly, the user is able to discern whether the currently received update information regards a version upgrade of an application (e.g., via the display of the first graphical object 43) or the update of content (e.g., via the display of the second graphical object 42).

Regarding the second update information, the controller 180 may provide at least the number of applications for which unconfirmed content (newly received content that has not been read or confirmed by the user) is available or an icon representing an application capable of providing the unconfirmed content via the second graphical object 42.

If it is difficult or unwieldy to display all corresponding images because the number of applications that have received the second update information is greater than a predetermined number, the controller 180 may display the number of applications that have received the second update information in association with the first folder 30. That is, if the number of applications providing unconfirmed content is greater than the predetermined number, the controller 180 may provide the number of applications providing the unconfirmed content via the second graphical object 42.

Also, if the number of applications providing the unconfirmed content is less than the predetermined number, the controller 180 may provide a corresponding icon (or image) for each of the applications via the second graphical object 42.

Figure 19:
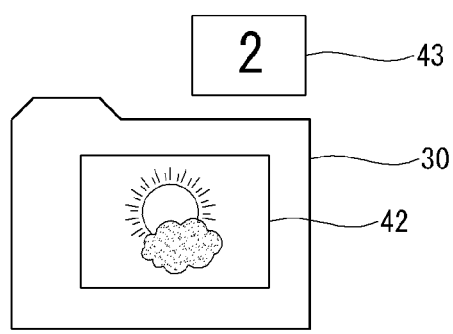

Referring to FIG. 19, if the controller 180 has received both the first update information and the second update information, the controller 180 may display both the first graphical object 43 to indicate receipt of the first update information and the second graphical object 42 to indicate receipt of the second update information.

Figure 20:
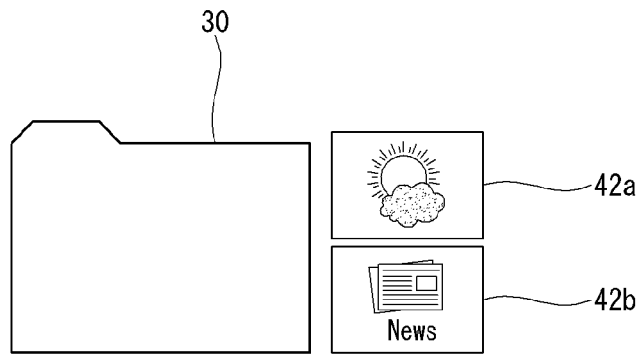

Referring to FIG. 20, upon receiving both the latest weather information and the latest news information as the second update information, the controller 180 may display two second graphical objects 42a, 42b—i.e., a weather image 42a and a news image 42b—in association with the first folder 30.

Upon receiving a touch signal for a graphical object (e.g., first graphical object 43 or second graphical object 42), the controller 180 may perform at least a first operation of displaying an icon representing one or more of the applications corresponding to the update information, a second operation of executing the version upgrade of an application for which a version upgrade is available, a third operation of displaying content associated with the second update information, or a fourth operation of displaying icons representing all the applications included in the folder corresponding to the selected graphical object.

For example, when the first graphical object 43 or the second graphical object 42 is selected, the controller 180 may display the corresponding update information, execute the corresponding application, or perform downloading for version upgrade of the corresponding application. The controller 180 may perform at least the first operation, the second operation, the third operation, and the fourth operation based on at least the type of the touch signal or the display state of the graphical object.

Figure 21:
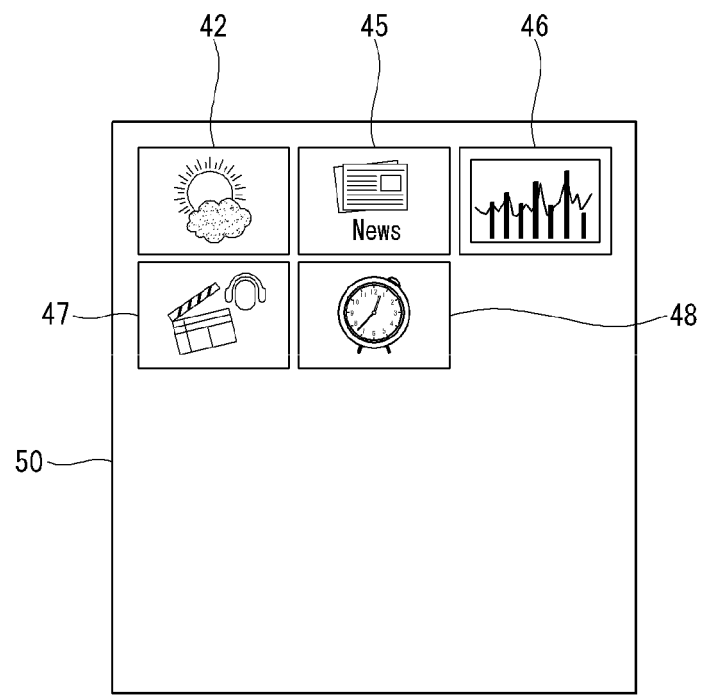

For example, when the weather image 42 is displayed on the first folder 30 (see, e.g., FIG. 17), if the user performs a single touch on the display area of the weather image 42 or the display area of the first folder 30, all the applications (the icons corresponding to all the applications) that are included in the first folder 30 may be displayed on the touchscreen 151. FIG. 21 is a view of a display screen illustrating an example in which the icons 42, 45, 46, 47, and 48 corresponding to all the applications included in the first folder 30 are provided in a pop-up window 50.

Also, if the user performs a double touch or a longer-duration touch on the display area of the weather image 42 or the display area of the first folder 30 (see, e.g., FIG. 17), the weather application corresponding to the weather image 42 may be executed to provide the user with newly received weather information.

When two or more second graphical objects are displayed (see, e.g., FIG. 20) such that they overlap with (or are associated with) the first folder 30, if the user performs a single touch on the display area of the first folder 30, the pop-up window 50 of FIG. 21 is displayed. If the user performs a double touch or a longer-duration touch on the display area of the first folder 30, the applications corresponding to the two or more second graphical objects (or the icons corresponding to the applications) may be displayed on the touchscreen 151 in the pop-up window 50.

When at least some applications included in the first folder 30 (or icons corresponding to the at least some applications) are displayed as described above, the controller 180 may cease display of the applications (or corresponding icons) if a certain amount of time passes without receiving a subsequent input action from the user. For example, when the user performs a single touch on the first folder 30 (see, e.g., FIG. 17), the controller 180 may display the pop-up window 50 on the touchscreen 151, as illustrated in FIG. 21, and the controller 180 may delete the pop-up window 50 from the touchscreen 151 (or cease display of the pop-up window 50) if a certain amount of time passes without receiving a user's selection of any one of the icons 42, 45, 46, 47, and 48 displayed in the pop-up window 50.

Referring to FIG. 20, the weather image 42a and the news image 42b are displayed such that they are spaced apart from the first folder 30. As described earlier, when the user selects the first folder 30, the controller 180 may display the pop-up window 50 shown in FIG. 21 on the touchscreen 151. Moreover, the controller 180 may execute the weather application when the user selects the weather image 42a and, when the user selects the news image 42b, the controller 180 may execute the news application corresponding to the news image 42b to provide newly received news information to the user.

For a predetermined one of the applications that receives update information (e.g., first update information and the second update information) at a rate faster than a predetermined first rate (or frequency), the controller 180 may display the corresponding graphical object according to a predetermined second rate (or frequency). For example, content such as stock prices and other types of news may be updated in real time or close to real time, and, correspondingly, display of the content (in the folder to which the update information corresponds) may be updated in real time or close to real time.

In such a situation, according to one embodiment, even when content unconfirmed by the user is received, the controller 180 may provide the second graphical object according to the second interval, rather than displaying the second graphical object upon each receipt of the unconfirmed content.

Figure 22:
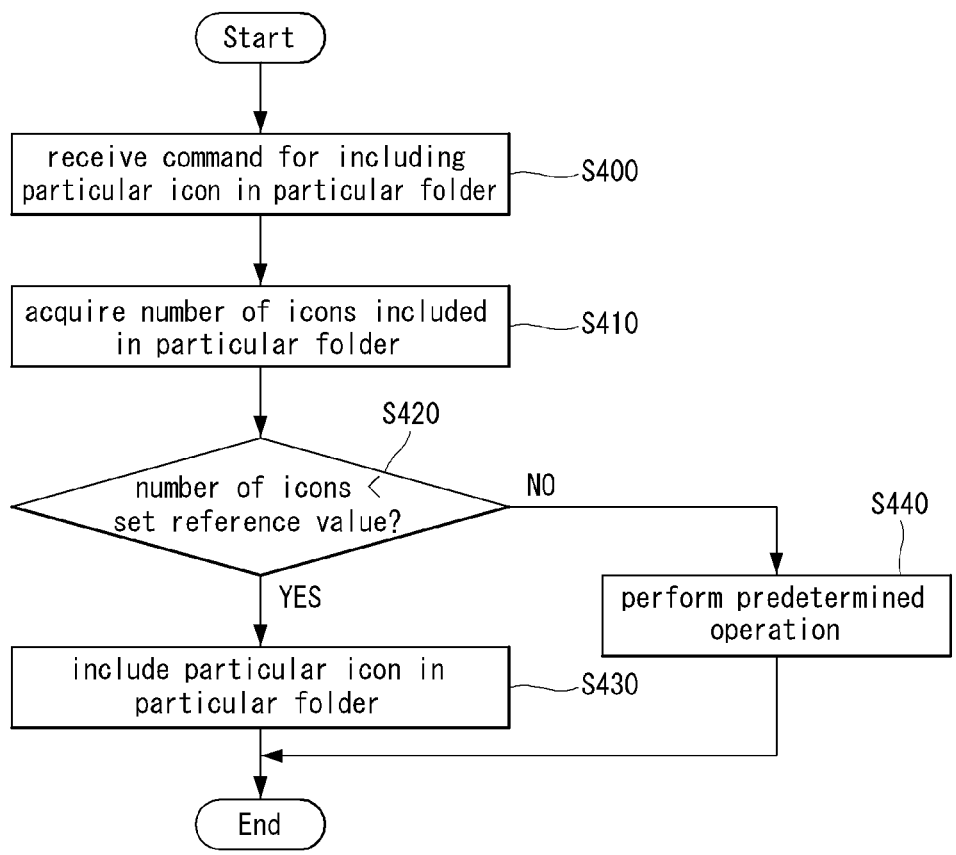
FIG. 22 is a flowchart of a method of controlling display of an icon in a mobile terminal according to an embodiment of the present invention.
Figure 23:
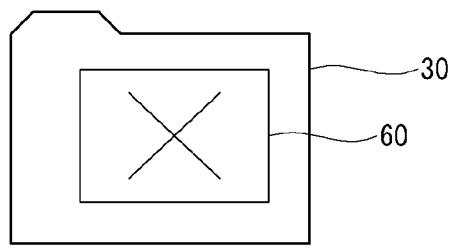
FIG. 23 illustrates an example of screen display for illustrating the method of FIG. 22.

FIG. 22 is a flowchart of a method of controlling display of an icon in a mobile terminal according to another embodiment of the present invention. FIG. 23 is a view of a (partial) display for illustrating the method of FIG. 22, which may be implemented in the mobile terminal 100 described with reference to FIG. 1. In the following description, the method according to the above embodiment and the operation of the mobile terminal 100 implementing the method will be described in more detail.

Referring to FIG. 22, the controller 180 may receive a command for including a particular icon in a particular folder (e.g., the first folder 30 (see, e.g., FIG. 5) or the second folder 31 (see, e.g., FIG. 9)) created according to one of the earlier-described embodiments of the present invention (FIG. 22, S400). The controller 180 may acquire (or determine) the number of icons included in the particular folder (FIG. 22, S410).

For example, if the first icon 11 and the second icon 12 are included in the first folder 30, the number of icons included in the first folder 30 is determined to be two. As another example, if the first, second and third icons 11, 12 and 13 are included in the second folder 31, the number of icons included in the second folder 31 is determined to be three.

The controller 180 may determine whether the number of icons is smaller than a preset reference value (FIG. 22, S420). If it is determined that the number of icons is smaller than the reference value, the controller 180 may include the particular icon in the particular folder in response to the command (FIG. 22, S430).

If it is determined that the number of icons is not smaller than the reference value, the controller 180 may perform a predetermined operation (FIG. 22, S440). As an example of the predetermined operation, if the user requests including the particular icon in the particular folder by dragging the particular icon and releasing it at a position where the particular folder is displayed, the controller 180 may perform an operation of returning the particular icon to the original position, instead of including the particular icon in the particular folder, as requested by the user.

Moreover, as a further example of the predetermined operation, if the command is received (see, e.g., FIG. 22, S400), the controller 180 may display a particular graphical object 60 (see FIG. 23) instead of including the particular icon in the particular folder, as requested by the user. Upon seeing the particular graphical object 60, the user will recognize that the particular folder cannot contain any more icons.

In addition, as an alternative example of the predetermined operation, the controller 180 may delete (one or more of) the other icons already included in the particular folder and include the particular icon in the particular folder. It is understood that the other icons to be deleted may be determined (or selected) in various ways. For example, the controller 180 may delete an icon having the lowest frequency of use among the icons included in the particular folder. As another example, the controller 180 may delete the first icon (e.g., the oldest icon) included in the particular folder or the last icon (e.g., the newest icon) included in the folder among the icons included in the particular folder.

The disclosed controlled display of an icon in a mobile terminal according to embodiments of the present invention may be captured in computer-readable recording media as a program for execution in computers. Methods of controlling an electronic device according to embodiments of the present invention may be implemented using software. When the method is implemented using software, operations of the method may correspond to code segments executing a certain task. Programs or code segments may be stored in processor-readable media or transmitted through computer data signals combined with carriers over transmission media or a communication network.

Computer-readable recording media may include all kinds of recording devices in which data capable of being read by a computer system is stored. For example, the computer-readable recording media may include ROM, RAM, CD-ROM, DVD-ROM, DVD-RAM, magnetic tapes, floppy disks, hard disks, and optical data storage devices. The computer-readable recording media may also be stored and executed as codes, which are distributed into computer apparatuses connected over a network and readable by computers in a distributed manner.

Embodiments of the present invention are not limited to the embodiments disclosed herein and the accompanying drawings. It will be apparent to those skilled in the art that various substitutions, modifications and changes can be made without departing from the technical spirit or scope of the present invention. Further, the embodiments described herein are not limiting, and all or some of the embodiments may be selectively combined so as to be modified in various ways.

What is claimed is:

1. A mobile terminal comprising:
   a display for displaying a folder icon corresponding to at least one application;
   a communication unit for receiving update information corresponding at least partially to the at least one application; and
   a controller for controlling the display to display the folder icon and, upon receipt of the update information by the communication unit, for controlling the display to display a graphical object indicating the receipt of the update information and corresponding to the folder icon,
   wherein the update information comprises a first update information associated with a version upgrade or second update information associated with content to be provided to a user,
   wherein the controller is further for controlling the display to display a first graphical object indicating the receipt of the first update information and to display a second graphical object indicating the receipt of the second update information, and
   wherein the first graphical object and the second graphical object are different from each other in appearance.

2. The mobile terminal of claim 1, wherein the first graphical object indicates a number of the at least one application for which the version upgrade is available.

3. The mobile terminal of claim 1, wherein the second graphical object at least indicates a number of the at least one application for which unconfirmed content is available or includes an icon corresponding to the at least one application for which the unconfirmed content is available.

4. The mobile terminal of claim 3, wherein:
   the second graphical object indicates the number of the at least one application for which unconfirmed content is available if the number of the at least one application for which unconfirmed content is available is greater than a predetermined number, and
   the second graphical object includes the icon corresponding to the at least one application for which the unconfirmed content is available if the number of the at least one application for which unconfirmed content is available is less than the predetermined number.

5. The mobile terminal of claim 1, wherein the controller is further for controlling the display to display the graphical object at a predetermined first frequency if the update information is received at a frequency higher than a predetermined second frequency.

6. The mobile terminal of claim 1, wherein:
   the update information comprises first update information associated with a version upgrade or second update information associated with content to be provided to a user,
   the display comprises a touchscreen, and
   the controller is further for performing a first operation, a second operation, a third operation or a fourth operation upon detecting a touch signal selecting the graphical object, the first operation comprising controlling the display to display an icon representing the at least one application, the second operation comprising executing version upgrade of the at least one application for which a version upgrade is available, the third operation comprising controlling the display to display the content associated with the second update information, and the fourth operation comprising controlling the display to display one or more icons representing all applications included in a folder corresponding to the folder icon.

7. The mobile terminal of claim 6,
   wherein the controller performs the first operation, the second operation, the third operation or the fourth operation based on a type of the touch signal, and
   wherein the type of the touch signal comprises at least a single touch signal, a double touch signal or a long touch signal.

8. A mobile terminal comprising:
   a touchscreen configure to display a plurality of icons comprising a first icon and a second icon; and
   a controller configured to:
   receive a touch action on the first icon and the second icon;
   correlate the first icon and the second icon with each other in response to the touch action; and
   create and display a folder icon when the touch action is maintained for a predetermined time period, when the folder icon includes the first icon and the second icon;
   wherein the touch action comprises concurrent touch actions of both the first icon and the second icon, and
   wherein the controller is further configured to create and display the folder icon if the concurrent touch actions of both the first icon and the second icon are moved away from respective display locations of the first icon and the second icon.

9. A method of managing display of an icon in a mobile terminal, the method comprising:
   displaying, by a display, a folder icon corresponding to at least one application;
   receiving, by a communication unit, update information corresponding at least partially to the at least one application; and
   controlling, by a controller upon receipt of the update information by the communication unit, the display to display a graphical object indicating the receipt of the update information and corresponding to the folder icon,
   wherein the update information comprises first update information associated with a version upgrade or second update information associated with content to be provided to a user,
   wherein controlling the display to display the graphical object comprises controlling the display to display a first graphical object indicating the receipt of the first update information or to display a second graphical object indicating the receipt of the second update information, and wherein the first graphical object and the second graphical object are different from each other in appearance.

10. The method of claim 9, wherein the first graphical object indicates a number of the at least one application for which the version upgrade is available.

11. The method of claim 9, wherein the second graphical object at least indicates a number of the at least one application for which unconfirmed content is available or includes an icon corresponding to the at least one application for which the unconfirmed content is available.

12. The method of claim 9, wherein controlling the display to display the graphical object comprises controlling the display to display the graphical object at a predetermined first frequency if the update information is received at a frequency higher than a predetermined second frequency.

13. A method of managing display of an icon in a mobile terminal, the method comprising:
displaying, via a display, a folder icon corresponding to a folder comprising a plurality of icons;
displaying, via a display, at least one of the plurality of icons upon receiving a first touch action on the displayed folder icon;
controlling, via a controller, the display to delete a selected icon from the folder upon receiving a second touch action for selecting the icon from the plurality of icons; and
controlling, via the controller, the display to display a graphical object representing update information in or around the displayed folder icon upon receiving the update information corresponding to at least one of the plurality of icons,
wherein the update information comprises first update information associated with a version upgrade or second update information associated with content to be provided to a user,
wherein displaying the graphical object comprises displaying a first graphical object indicating the receipt of the first update information or displaying a second graphical object indicating the receipt of the second update information, and
wherein the first graphical object and the second graphical object are different from each other in appearance.

14. A method of managing display of an icon in a mobile terminal, the method comprising:
displaying, via a display, a folder icon including at least one application;
receiving a command for including a particular icon in a particular folder, the command being a dragging input for dragging the particular icon to the particular folder;
acquiring, the number of icons included in the particular folder;
performing, via the controller, a predetermined operation when the number of icons is not smaller than a predetermined reference value; and
displaying, via the display, a particular graphical object for indicating that the particular folder cannot contain any more icons.

15. The method of claim 14,
wherein the predetermined operation comprises returning the particular icon to the original position.

16. The method of claim 14,
wherein the predetermined operation comprises:
deleting the other icons already included in the particular folder; and
controlling the particular icon to be included in the particular folder.

17. A mobile terminal comprising:
a touchscreen; and
a controller configured to:
cause the touchscreen to display a plurality of icons comprising a first icon and a second icon;
receive a touch action at the first icon and the second icon, wherein the touch action includes a simultaneous touch to both the first icon and the second for a period of time, and wherein the touch action includes a first touch extending from a displayed location of the first icon and a second touch extending from a displayed location of the second icon; and
cause the touchscreen to display a folder icon when the simultaneous touch is maintained for a threshold period of time, wherein the folder icon includes the first icon and the second icon.

18. A mobile terminal comprising:
a touch screen configured to display a folder icon corresponding to including at least one application; and
a controller configured to:
receive a command for including a particular icon in a particular folder, the command being a dragging input for dragging the particular to the particular folder;
generate the number of icons included in the particular folder;
perform a predetermined operation when the number of icons is not smaller then a predetermined reference value; and
display a particular graphical object for indicating that the particular folder cannot contain any more icons on the touch screen.

* * * * *